C. O. PROWSE.
RESILIENT WHEEL.
APPLICATION FILED APR. 29, 1919.

1,368,837.

Patented Feb. 15, 1921.

WITNESSES
John J. Lynch
A. L. Kitchin

INVENTOR
Charles O. Prowse
BY
ATTORNEYS

C. O. PROWSE.
RESILIENT WHEEL.
APPLICATION FILED APR. 29, 1919.

1,368,837.

Patented Feb. 15, 1921.
2 SHEETS—SHEET 2.

WITNESSES
John J. Lynch
A. L. Kitchin

INVENTOR
Charles O. Prowse
BY
Munn & Co
ATTORNEYS

UNITED STATES PATENT OFFICE.

CHARLES O. PROWSE, OF NEW YORK, N. Y.

RESILIENT WHEEL.

1,368,837.  Specification of Letters Patent.  Patented Feb. 15, 1921.

Application filed April 29, 1919. Serial No. 293,449.

*To all whom it may concern:*

Be it known that I, CHARLES O. PROWSE, a citizen of the United States, and a resident of the city of New York, borough of Manhattan, in the county and State of New York, have invented a new and Improved Resilient Wheel, of which the following is a full, clear, and exact description.

This invention relates to resilient wheels, and has for an object the provision of an improved construction in which the resilient elements are arranged to be brought under tension when the wheel is rotated in either direction.

Another object of the invention is to provide a resilient wheel in which the resilient elements are arranged to be brought under tension as a greater or less load is brought to bear thereon, the arrangement being such that the springs will be at a tangent.

A further object of the invention is the provision of a resilient structure for a wheel and arrangement of the same within protecting means so that the dirt and dust will not interfere with the proper operation of the respective parts.

Figure 3:
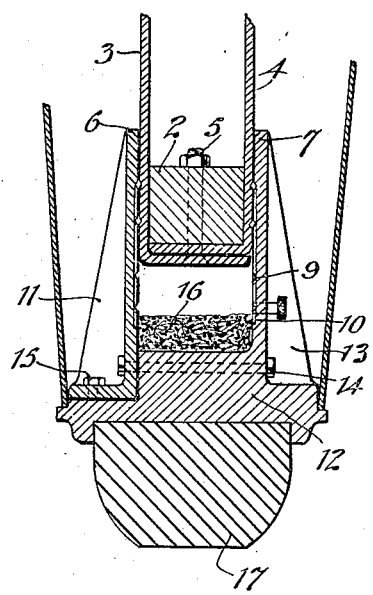
Fig. 3 is a fragmentary detail sectional view similar to the lower part of Fig. 2, but on an enlarged scale.

Referring to the accompanying drawings by numerals 1 indicates a wheel body which is provided with a hub and spokes as well as a felly 2. These parts may be made from wood or any desired material, and of substantially any desired detail shape. The sides of the felly 2, however, are straight in order to receive the plates 3 and 4. These plates may be made integral, though preferably they are made separately and overlap as shown in Fig. 3. Any desired number of bolts 5 are provided and positioned to extend through the overlapping parts of the plates 3 and 4 so as to clamp these plates firmly to the felly 2 so that they may act continually therewith and as bearing plates for the annular plates or rings 6 and 7. The respective plates 3 and 4 are provided with annular oil grooves 8 which coact with oil grooves 9 in the plates 6 and 7, said oil grooves 9 being crossed by suitable radial grooves 10 which will act as feeding means for the various other oil grooves as the wheel operates. Both of the plates 6 and 7 may be made as flat plates or rings, but preferably plate 6 is made substantially L-shape and with suitable bracing ribs 11, while plate 7 is provided with an annular ring 12 acting as an outer felly. Suitable braces 13 are also provided on plate 7 to resist lateral pressure. These plates are all preferably made from metal and the outer felly 12 may be made thick or thin as desired. In order to hold the plates 6 and 7 together suitable connecting means are provided, as for instance bolts 14 which preferably extend through the outer felly 12 as well as through the plates 6 and 7. In addition the plate 6 is secured to the outer felly 12 by a number of bolts 15 extending radially. By this construction and arrangement there is provided an annular groove in which the felly 2 and part of the plates 3 and 4 move. In this groove is arranged preferably a filling 16 carrying oil, said filling being waste, or any oil absorbing material. This oil carrying material 16 acts as a bumper in case an excessive strain is brought to bear on the wheel and cause an extreme movement of this kind. The outer felly 12 is provided with a groove for receiving any suitable tire 17, as for instance an ordinary solid rubber tire.

Figure 1:
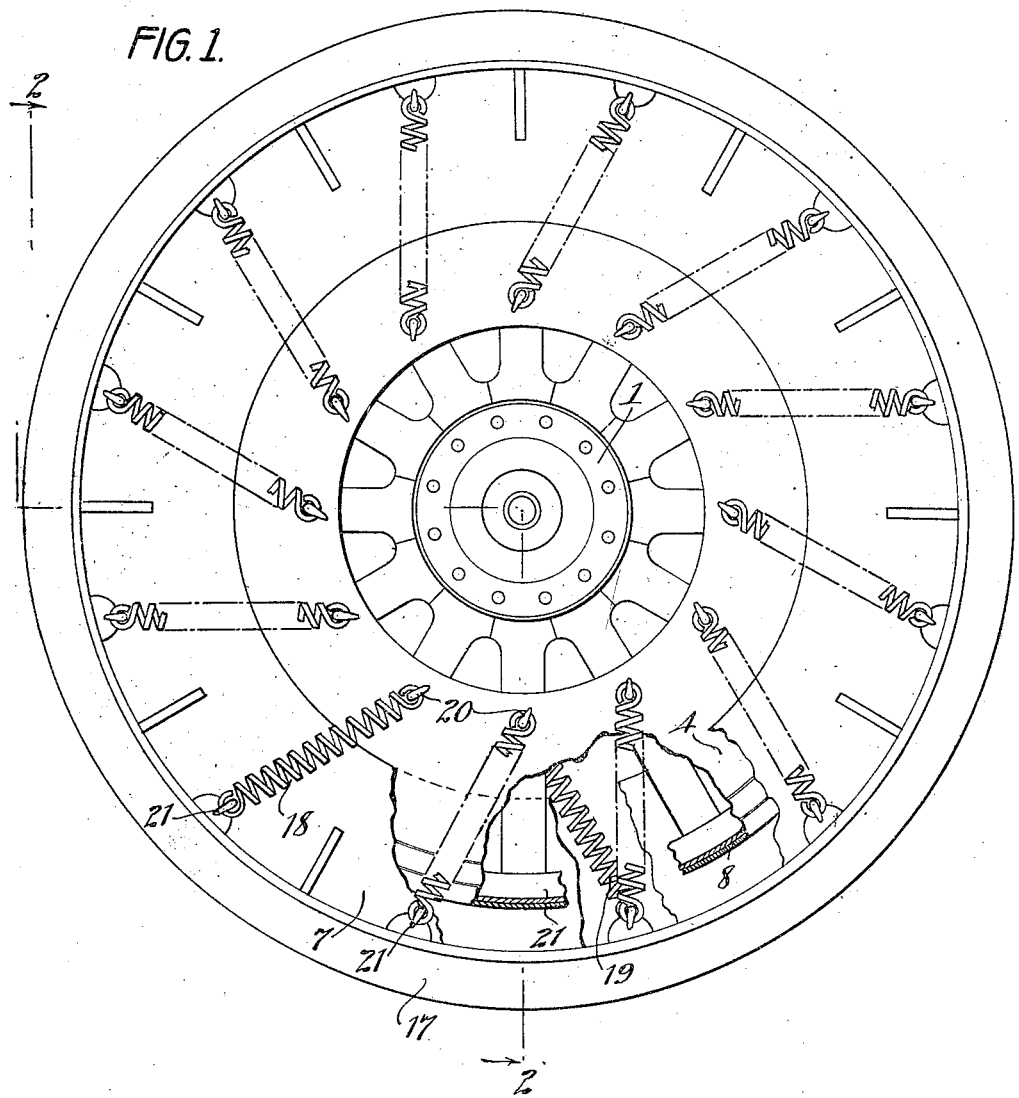
Figure 1 is a side view of a wheel disclosing an embodiment of the invention, certain parts being removed and broken away for better disclosing the working parts of the wheel.
Figure 2:
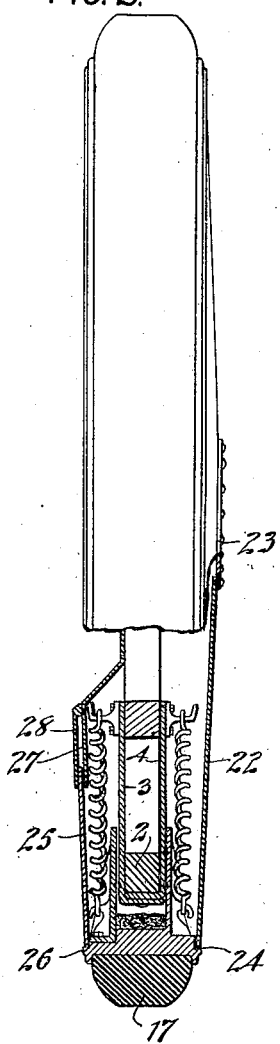
Fig. 2 is a sectional view through Fig. 1 on line 2—2.

In order to support the parts so that the felly 2 will normally remain substantially as shown in Figs. 2 and 3 a set of springs 18 is provided on one side of the wheel and a similar set of springs 19 on the opposite side. All of these springs are coil retractile springs and have one end connected with suitable retaining means, as for instance hooks 20 associated with the rings 6 and 7, while the opposite ends are connected with suitable connecting means, as for instance hooks 21 connected to or formed integral with the peripheral members of the plates 6 and 7 as indicated in Figs. 1 and 2. Preferably the hooks 20 are arranged exactly opposite each other, as well as the hooks 21 and the springs on one side of the wheel are arranged at the opposite tangent to the tangent at which the springs on the other side of the wheel are arranged, whereby when power is provided to the hub of wheel 1 for producing rotary movement one series or set of springs will be brought under tension, as for instance springs 18 and when turned in the opposite direction the opposite springs 19 will be torque or brought under tension. In case the wheel is standing still and a load is placed thereon, which naturally is carried by the hub of wheel 1 a stretching or tension of both sets of springs at the upper part of the wheel will take place so that the load will be distributed. Preferably all of the parts are under some tension so that when the wheel 1 is rotated a short distance in one direction and brings one set of springs under considerable tension the other set of springs will not be loose, though the tension thereof will be reduced. By this construction and arrangement the tension is transmitted to all of the springs on one side at one time and to most of the springs on both sides when an extra load is placed on the wheels. From this it will be seen that the load is carried by a majority of the springs by both sides acting at once. While one set of springs is relieved, though not loose, the other set of springs will receive the strain when the wheel member 1 begins to rotate and will transfer the strain therefrom through one set of springs to the outer felly 12 and from thence to the tire 17. This construction will permit the wheel to act as merely a traction or supporting wheel on a vehicle, or will permit the wheel to act as a power wheel in addition to a supporting wheel as the power would be readily and instantly transmitted through resilient action. In fact this resilient transmission will relieve the engine of sudden jerks when starting a heavy load as the resistance is gradually though quickly increased until the wheel begins to turn.

In order to protect and to cause the springs and the action of the plates or rings 6 and 7 and associate parts to function in a better manner means have been provided as shown in Figs. 2 and 3 for inclosing the same and thereby keeping the dust out of the moving parts. To accomplish this result an annular protecting ring 22 is provided which has a central plate 23 and which has its periphery fitted in the annular notches 24 where it is secured by screws, bolts, rivets, or in any desired manner. A similar, though smaller protecting ring 25 is arranged on the opposite, or inside face, of the wheel. Plate 25 is set into an annular groove or notch 26 and held in place in any desired manner, but instead of extending to the center of the wheel it falls short thereof for an appreciable distance and projects between the plates 27 and 28 where it slides back and forth as the wheel operates. Plates 27 and 28 are secured together in any desired way, as for instance by welding, plate 27 extending downwardly to the hub of wheel 1 where it is secured by bolts, rivets, or any other desired manner, and thereby prevents the entrance of dirt and dust. It is, of course, understood that an ample supply of oil is arranged between plates 27 and 28 so as to allow a free sliding movement without permitting the entrance of dirt. It will be noted that this arrangement is positioned an appreciable distance away from the tire 17 so that it will under ordinary circumstances be out of contact with any small bodies of water through which the wheel may pass. This arrangement will protect the springs and other parts of the wheel and will not interfere with the wheel being placed in position on an axle or being removed therefrom, plate 23 being detachably secured in place by bolts or other means. If preferred instead of using an appreciable amount of oil in plates 27 and 28 the edge of plate 25 could be provided with a felt on each side, held in place in any suitable manner, which when well oiled would prevent the entrance of dirt, dust and the like.

What I claim is:

A resilient wheel comprising a wheel body having a felly, a pair of plates connected to said felly, said plates having annular oil grooves arranged therein and also radial oil grooves connected with the annular oil grooves, a floating felly spaced radially from said wheel body, a second pair of annular plates rigidly secured to said floating felly, said last mentioned plates sliding telescopically over the plates on the wheel body, an oil saturated packing arranged in the groove provided by the plates associated with the felly, said packing acting as oil feeding means and as a bumper, and a plurality of springs connecting said wheel body and said felly.

CHARLES O. PROWSE.